(12) United States Patent
 Sakamoto

(10) Patent No.: US 12,072,177 B2
(45) Date of Patent: Aug. 27, 2024

(54) THREE-DIMENSIONAL SHAPE MEASURING APPARATUS, THREE-DIMENSIONAL SHAPE MEASURING METHOD, PROGRAM, AND STORAGE MEDIUM

(71) Applicant: NEC Corporation, Tokyo (JP)

(72) Inventor: Shizuo Sakamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 17/591,020

(22) Filed: Feb. 2, 2022

(65) Prior Publication Data

US 2022/0155056 A1    May 19, 2022

Related U.S. Application Data

(63) Continuation of application No. 16/980,978, filed as application No. PCT/JP2019/010414 on Mar. 13, 2019, now abandoned.

(30) Foreign Application Priority Data

Mar. 16, 2018 (JP) .................. 2018-049546

(51) Int. Cl.
 *G01B 11/25*    (2006.01)
(52) U.S. Cl.
 CPC ........ *G01B 11/2513* (2013.01); *G01B 11/254* (2013.01); *G01B 11/2522* (2013.01)
(58) Field of Classification Search
 CPC ............ G01B 11/2513; G01B 11/2522; G01B 11/254; G01B 11/2527; G06T 7/521
 (Continued)

(56) References Cited

U.S. PATENT DOCUMENTS 10,430,962 B2 * 10/2019 Seto .................. G01B 11/2509
2010/0008588 A1  1/2010 Feldkhun et al.
(Continued)

FOREIGN PATENT DOCUMENTS

| CN | 104040267 A | 9/2014 |
| JP | 06-137826 A | 5/1994 |

(Continued)

OTHER PUBLICATIONS

International Search Report of PCT/JP2019/010414 dated Apr. 9, 2019 [PCT/ISA/210].

(Continued)

*Primary Examiner* — Sunghee Y Gray

(57) ABSTRACT

A three-dimensional shape measuring apparatus includes: a single projector device that projects a first light pattern whose luminance changes at a first cycle and a second light pattern whose luminance changes at a second cycle that is longer than the first cycle on a measured object; an image capture device that acquire an image of the measured object on which the first or second light pattern is projected; and an image processing device that processes the image acquired by the image capture device. The image processing device includes a relative phase value calculation unit that calculates a relative phase value on each part of the measured object based on a luminance value of an image of the measured object on which the first light pattern is projected, an absolute phase value calculation unit that calculates an absolute phase value on each part of the measured object based on a luminance value and the relative phase value of an image of the measured object on which the second light pattern is projected, and a three-dimensional coordinate calculation unit that calculates three-dimensional coordinates at each part of the measured object based on the absolute phase value.

8 Claims, 9 Drawing Sheets

(58) Field of Classification Search
USPC .................................................. 356/603, 226
See application file for complete search history.

(56) References Cited

U.S. PATENT DOCUMENTS

| | | |
|---|---|---|
| 2013/0128282 A1 | 5/2013 | Ishigaki |
| 2017/0176178 A1 | 6/2017 | Inukai |

FOREIGN PATENT DOCUMENTS

| | | |
|---|---|---|
| JP | 10-122838 A | 5/1998 |
| JP | 2001-012925 A | 1/2001 |
| JP | 2001-124534 A | 5/2001 |
| JP | 2001-283198 A | 10/2001 |
| JP | 2003-004425 A | 1/2003 |
| JP | 2003-269928 A | 9/2003 |
| JP | 2005-091176 A | 4/2005 |
| JP | 2005-249684 A | 9/2005 |
| JP | 2006-214785 A | 8/2006 |
| JP | 2007-315864 A | 12/2007 |
| JP | 2006-009807 A | 1/2008 |
| JP | 2008-008907 A | 1/2008 |
| JP | 2008-157797 A | 7/2008 |
| JP | 2008-185370 A | 8/2008 |
| JP | 2009-025189 A | 2/2009 |
| JP | 2009-115612 A | 5/2009 |
| JP | 2010-038695 A | 2/2010 |
| JP | 2010-175554 A | 8/2010 |
| JP | 2010-281178 A | 12/2010 |
| JP | 2010-281776 A | 12/2010 |
| JP | 2014-025782 A | 2/2014 |
| JP | 2014-059239 A | 4/2014 |
| JP | 2015-524916 A | 8/2015 |
| JP | 2016-206749 A | 11/2015 |
| JP | 2017-020959 A | 1/2017 |
| JP | 2017-110991 A | 6/2017 |
| WO | 2016/174701 A1 | 11/2016 |

OTHER PUBLICATIONS

Japanese Office Action for JP Application No. 2020-506629 mailed on Feb. 16, 2021 with English Translation.
Extended European Search Report for EP Application No. EP19767084.7 daled on Mar. 10, 2021.
Tomislav Pribanic et al., "Efficient and Low-Cost 3D Structured Light System Based on a Modified Number-Theoretic Approach", EURASIP Journal on Advances in Signal Processing, vol. 2010, No. 1, pp. 1-11, Dec. 1, 2009.
Zuo Chao el al., "High-speed three-dimensional profilometry for multiple objects with complex shapes", Optics Express, vol. 20, No. 17, Aug. 10, 2012, pp. 19493-19510.
Zuo Chao et al., "Temporal phase unwrapping algorithms for fringe projection profilometry: A comparative review", Optics and Lasers in Engineering, Elsevier, Amsterdam, NL, vol. 85, May 6, 2016, pp. 64-103.
Van Der Jeught Sam et al., "Real-time structured light profilometry: a review", Optics and Lasers in Engineering, Elsevier, Amsterdam, NL, vol. 87, Feb. 11, 2016, pp. 18-31.
Zuo Chao et al., "Phase shifting algorithms for fringe projection profilometry: A review", Optics and Lasers in Engineering, vol. 109, Oct. 1, 2018, pp. 23-59.
Japanese Office Action for JP Application No. 2020-506629 mailed on Jul. 6, 2021 with English Translation.
Japanese Office Communication for JP Application No. 2020-506629 mailed on Nov. 11, 2021 with English Translation.
JP Office Action for JP Application No. 2021-198212, mailed on Nov. 29, 2022 with English Translation.
US Office Action for U.S. Appl. No. 17/591,910, mailed on Aug. 29, 2023.
US Office Action for U.S. Appl. No. 16/980,978 mailed on Apr. 26, 2022.

* cited by examiner

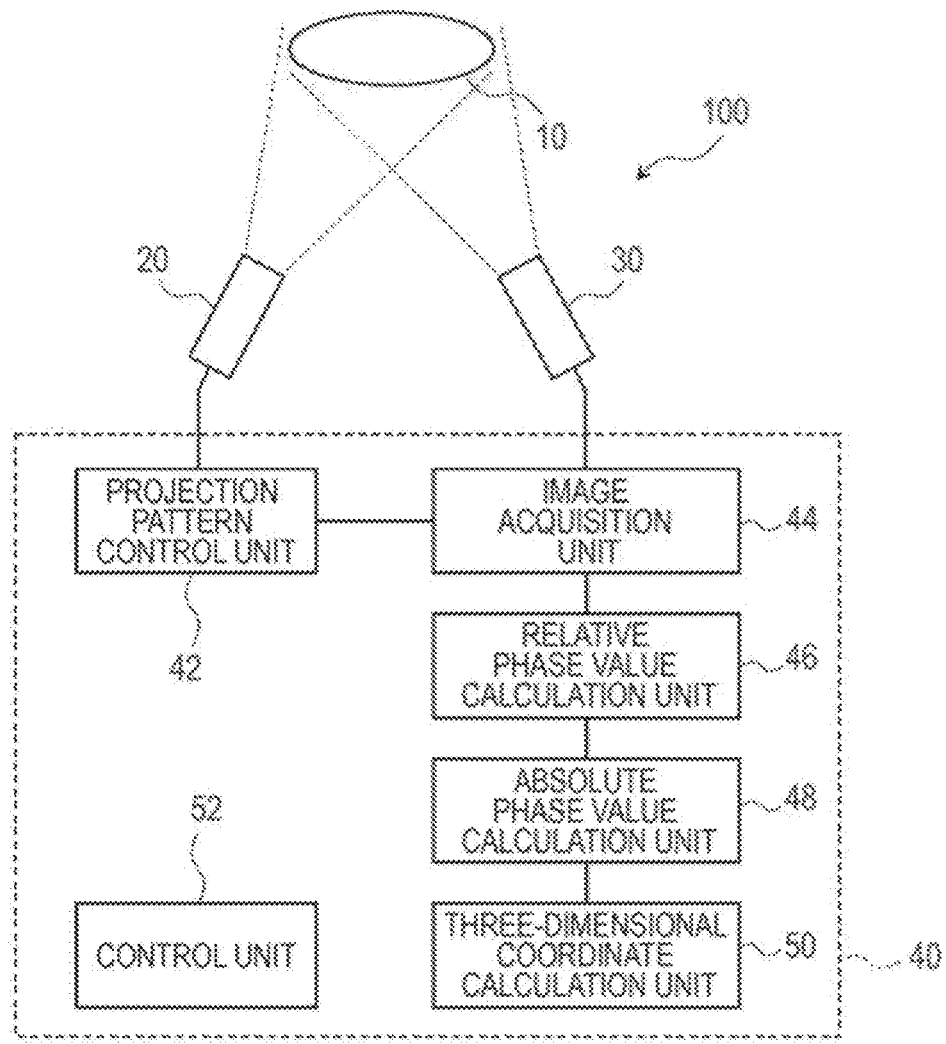
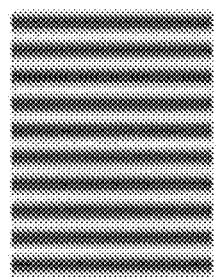

$t = \pi/2$ $t = \pi$ $t = 3\pi/2$ t = 0 t = π/2 t = 0 t = 1

THREE-DIMENSIONAL SHAPE MEASURING APPARATUS, THREE-DIMENSIONAL SHAPE MEASURING METHOD, PROGRAM, AND STORAGE MEDIUM

CROSS-REFERENCE TO RELATED APPLICATIONS

The present application is a continuation application of U.S. patent application Ser. No. 16/980,978 filed on Sep. 15, 2020, which is a National Stage Entry of international application PCT/JP2019/010414, filed on Mar. 13, 2019, which claims the benefit of priority from Japanese Patent Application 2018-049546 filed on Mar. 16, 2018, the disclosures of all of which are incorporated in their entirety by reference herein.

TECHNICAL FIELD

The present invention relates to a three-dimensional shape measuring apparatus, a three-dimensional shape measuring method, a program, and a storage medium.

BACKGROUND ART

Conventionally, various methods for measuring the three-dimensional shape of an object have been proposed. For example, a method of identifying a three-dimensional shape by using a plurality of cameras to capture a measured object and using a triangulation principle and a method of identifying a three-dimensional shape by projecting a predetermined light pattern on a measured object and measuring a projected light pattern are known. Patent Literatures 1 to 6 disclose a use of a sinusoidal pattern as a light pattern to be projected on a measured object. By using a sinusoidal pattern for a light pattern to be projected on a measured object, it is possible to identify the position on the measured object based on a phase of a projected light (luminance) as a clue and accurately detect a three-dimensional shape of the measured object. However, when a light pattern having periodicity such as a sinusoidal pattern is used as a light pattern projected on a measured object, since points shifted by N cycles may be a candidate due to the nature thereof, it is difficult to uniquely define a three-dimensional shape.

Accordingly, Patent Literature 1 and the like solve the ambiguity described above by adding one or more projectors that project light patterns or one or more cameras that capture a measured object to uniquely define a three-dimensional shape. Further, in Patent Literature 6 or the like, a three-dimensional shape is uniquely defined by projecting two types of sinusoidal patterns having different cycles, respectively, to solve the ambiguity described above.

CITATION LIST

Patent Literature

PTL 1: Japanese Patent Application Laid-Open No. 2001-012925
PTL 2: Japanese Patent Application Laid-Open No. 2003-269928
PTL 3: Japanese Patent Application Laid-Open No. 2006-214785
PTL 4: Japanese Patent Application Laid-Open No. 2008-009807
PTL 5: Japanese Patent Application Laid-Open No. 2009-115612
PTL 6: Japanese Patent Application Laid-Open No. 2010-281178

SUMMARY OF INVENTION

Technical Problem

The conventional method of resolving the ambiguity described above by projecting two types of sinusoidal patterns having different cycles, respectively, has a problem of requiring a long time for measurement because the projection period of the light pattern is doubled.

The present invention intends to provide a three-dimensional shape measuring apparatus, a three-dimensional shape measuring method, a program, and a storage medium that may measure the three-dimensional shape of an object at high accuracy and in a short time with a simpler system.

Solution to Problem

According to one example aspect of the present invention, provided is a three-dimensional shape measuring apparatus including: a single projector device that projects a first light pattern whose luminance changes at a first cycle and a second light pattern whose luminance changes at a second cycle that is longer than the first cycle on a measured object; an image capture device that acquires an image of the measured object on which the first light pattern or the second light pattern is projected; and an image processing device that processes the image acquired by the image capture device, and the image processing device includes a relative phase value calculation unit that, based on a luminance value at each of pixels of an image of the measured object on which the first light pattern is projected, calculates a relative phase value on each part of the measured object corresponding to each of the pixels, an absolute phase value calculation unit that, based on a luminance value and the relative phase value at each of pixels of an image of the measured object on which the second light pattern is projected, calculates an absolute phase value on each the part of the measured object corresponding to each of the pixels, and a three-dimensional coordinate calculation unit that, based on the absolute phase value, calculates three-dimensional coordinates at each the part of the measured object corresponding to each of the pixels.

Further, according to another example aspect of the present invention, provided is a three-dimensional shape measuring method including the steps of: projecting a first light pattern whose luminance changes at a first cycle on a measured object and acquiring an image of the measured object on which the first light pattern is projected; projecting a second light pattern whose luminance changes at a second cycle that is longer than the first cycle on the measured object by the same projector device as a projector device used for projection of the first light pattern and acquiring an image of the measured object on which the second light pattern is projected; based on a luminance value at each of pixels of an image of the measured object on which the first light pattern is projected, calculating a relative phase value on each part of the measured object corresponding to each of the pixels; based on a luminance value and the relative phase value at each of pixels of an image of the measured object on which the second light pattern is projected, calculating an absolute phase value on each the part of the measured object corresponding to each of the pixels; and based on the absolute phase value, calculating three-dimensional coordinates at each the part of the measured object corresponding to each of the pixels.

Further, according to yet another example aspect of the present invention, provided is a program that causes a computer to function as: a unit that controls a single projector device to project a first light pattern whose luminance changes at a first cycle or a second light pattern whose luminance changes at a second cycle that is longer than the first cycle on a measured object; a unit that acquires an image of the measured object on which the first light pattern is projected and an image of the measured object on which the second light pattern is projected; a unit that, based on a luminance value at each of pixels of an image of the measured object on which the first light pattern is projected, calculates a relative phase value on each part of the measured object corresponding to each of the pixels; a unit that, based on a luminance value and the relative phase value at each of pixels of an image of the measured object on which the second light pattern is projected, calculates an absolute phase value on each the part of the measured object corresponding to each of the pixels; and a unit that, based on the absolute phase value, calculates three-dimensional coordinates at each the part of the measured object corresponding to each of the pixels.

Advantageous Effects of Invention

According to the present invention, it is possible to measure a three-dimensional shape of a measured object at high accuracy and in a short time with a simpler system.

BRIEF DESCRIPTION OF DRAWINGS

FIG. 1 is a schematic diagram illustrating a configuration example of a three-dimensional shape measuring apparatus according to a first example embodiment of the present invention.

FIG. 2A is a diagram illustrating an example of a short cycle light pattern used in a three-dimensional shape measuring method according to the first example embodiment of the present invention.

DESCRIPTION OF EMBODIMENTS

First Example Embodiment

A three-dimensional shape measuring apparatus and a three-dimensional shape measuring method according to a first example embodiment of the present invention will be described with reference to FIG. 1 to FIG. 5.

Figure 3A:
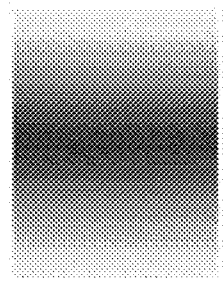
FIG. 3A is a diagram illustrating an example of a long cycle light pattern used in the three-dimensional shape measuring method according to the first example embodiment of the present invention.
Figure 3B:
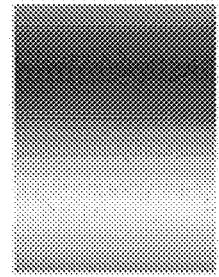
FIG. 3B is a diagram illustrating an example of a long cycle light pattern used in the three-dimensional shape measuring method according to the first example embodiment of the present invention.
Figure 4:
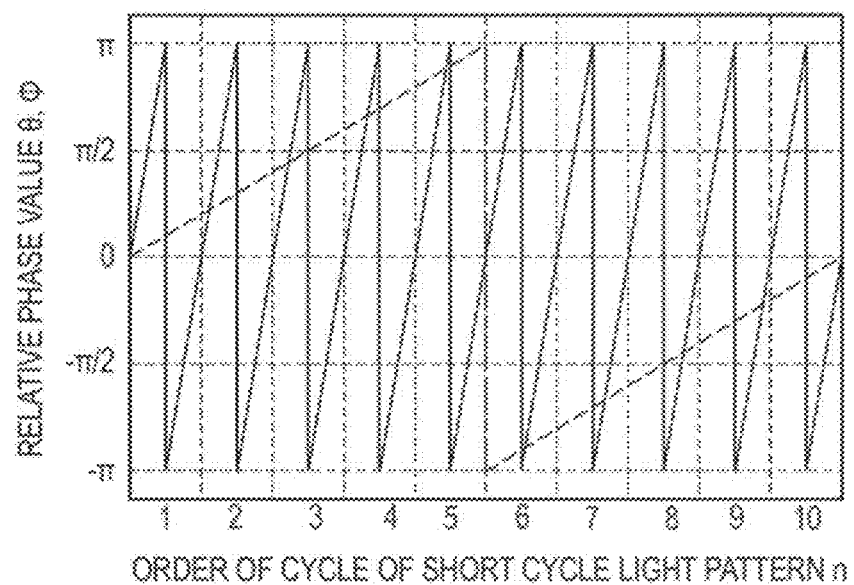
FIG. 4 is a graph illustrating a method of calculating an absolute phase value in the three-dimensional shape measuring method according to the first example embodiment of the present invention.
Figure 5:
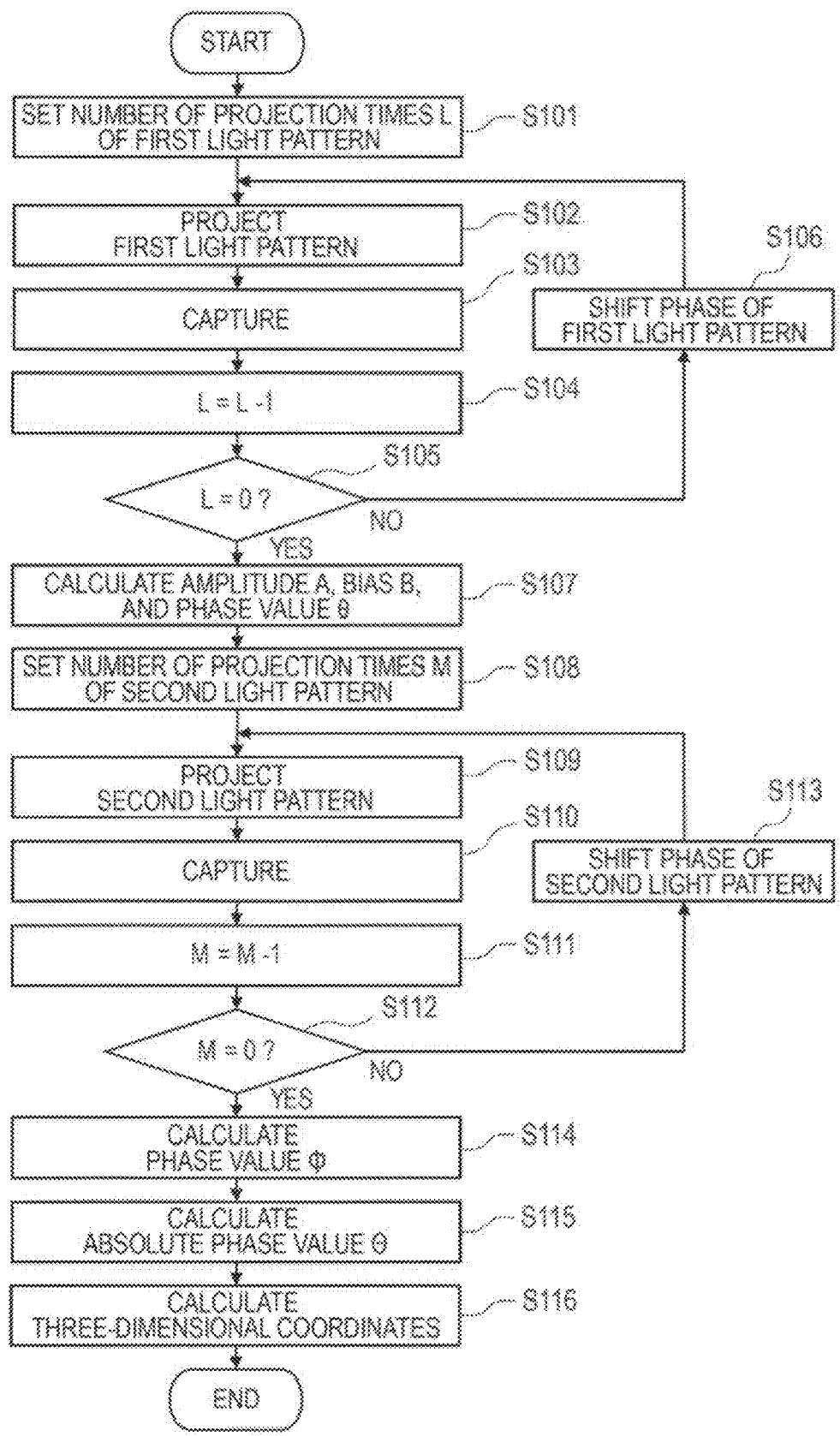
FIG. 5 is a flowchart illustrating the three-dimensional shape measuring method according to the first example embodiment of the present invention.

FIG. 1 is a schematic diagram illustrating a configuration example of the three-dimensional shape measuring apparatus according to the present example embodiment. FIG. 2A to FIG. 2D are diagrams each illustrating an example of a short cycle light pattern used in the three-dimensional shape measuring method according to the present example embodiment. FIG. 3A and FIG. 3B are diagrams each illustrating an example of a long cycle light pattern used in the three-dimensional shape measuring method according to the present example embodiment. FIG. 4 is a graph illustrating a calculation method of an absolute phase value in the three-dimensional shape measuring method according to the present example embodiment. FIG. 5 is a flowchart illustrating the three-dimensional shape measuring method according to the present example embodiment.

As illustrated in FIG. 1, a three-dimensional shape measuring apparatus 100 according to the present example embodiment includes a projector device 20, an image capture device 30, and an image processing device 40. The image processing device 40 includes a projection pattern control unit 42, an image acquisition unit 44, a relative phase value calculation unit 46, an absolute phase value calculation unit 48, a three-dimensional coordinate calculation unit 50, and a control unit 52.

The projector device 20 is a device that projects a predetermined light pattern on a measured object 10 whose three-dimensional shape is to be measured. The projector device 20 is not particularly limited and may be, for example, a digital light processing (DLP) projector, a liquid crystal projector, or the like. A DLP projector or a liquid crystal projector can project any light patterns at a high rate and is preferable for reducing time required for a three-dimensional shape measurement. Reduction in the measuring time is preferable for measuring a three-dimensional shape of an object that is moving (moving object) such as when face authentication of a person is performed, in particular. Note that details of the light pattern projected on the measured object 10 will be described later. The measured object 10 may be a face, a head, a finger, a fingerprint, a ridge of a fingerprint, or other parts including a part of the body of a person but is not limited thereto.

The image capture device 30 is a device that captures an image of the measured object 10 on which a light pattern emitted from the projector device 20 is projected. The image capture device 30 includes a solid-state image pickup device such as a charge coupled device (CCD) image sensor or a complementary metal-oxide-semiconductor (CMOS) image sensor. Further, the image capture device 30 includes an optical system that captures an image of a subject on a capturing plane of a solid-state image pickup device, a signal processing circuit that performs signal processing on the output of the solid-state image pickup device to obtain a luminance value on a pixel basis, and the like.

The image processing device 40 may be formed of a general purpose information processing device (computer) having a central processing unit (CPU), a memory device, a display, a storage device such as a hard disk, various interfaces for input/output, or the like. Further, the image processing device 40 has a program that causes the information processing device to perform a three-dimensional shape measuring method described later, and when the CPU executes the program, the function of each unit of the image processing device 40 can be implemented.

The projection pattern control unit 42 has a function of generating a light pattern to be projected on the measured object 10 and storing the light pattern in the storage device in advance. Further, the projection pattern control unit 42 has a function of transmitting data of a light pattern stored in the storage device to the projector device 20 via a general purpose display interface such as a digital visual interface (DVI). Further, the projection pattern control unit 42 has a function of controlling the operation of the projector device 20 (turning on/off, dimming adjustment, or the like of a light source) via a general purpose communication interface such as RS232 or universal serial bus (USB).

The image acquisition unit 44 has a function of acquiring image data captured by the image capture device 30 and storing the image data in a memory device. Further, the image acquisition unit 44 has a function of controlling the operation of the image capture device 30 (a timing of capturing or the like) via a general purpose communication interface such as RS232 or USB. Further, the image acquisition unit 44 has a function of instructing the projection pattern control unit 42 to cause the projector device 20 to project a light pattern.

The relative phase value calculation unit 46 has a function of calculating a phase value in accordance with a luminance value (phase values θ and φ described later) on a pixel basis based on an image captured by the image capture device 30. Note that details of a method of calculating a phase value will be described later.

The absolute phase value calculation unit 48 has a function of calculating an absolute phase value (an absolute phase value Θ described later) on a pixel basis based on a phase value calculated by the relative phase value calculation unit 46. Note that details of a method of calculating a phase value will be described later.

The three-dimensional coordinate calculation unit 50 has a function of finding three-dimensional coordinates of a projection point P (X, Y, Z) on the measured object 10 corresponding to a point p(x, y) on an image by using calculation based on an absolute phase value of each pixel calculated by the absolute phase value calculation unit 48.

The control unit 52 has a function of generally controlling the above units of the image processing device 40.

Next, before the three-dimensional shape measuring method according to the present example embodiment is specifically described, a basic principle of a three-dimensional shape measuring method using a sinusoidal grating phase shift method will be described.

The sinusoidal grating phase shift method is a method of projecting a sinusoidal grating light pattern as illustrated in FIG. 2A to FIG. 2D (hereafter, referred to as a sinusoidal pattern) on the measured object 10 while gradually shifting the phase and identifying the three-dimensional shape based on captured images of the measured object 10 on which the light pattern is projected.

Figure 2B:
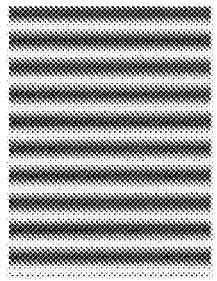
FIG. 2B is a diagram illustrating an example of a short cycle light pattern used in the three-dimensional shape measuring method according to the first example embodiment of the present invention.
Figure 2C:
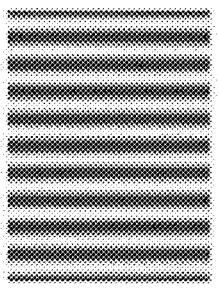
FIG. 2C is a diagram illustrating an example of a short cycle light pattern used in the three-dimensional shape measuring method according to the first example embodiment of the present invention.
Figure 2D:
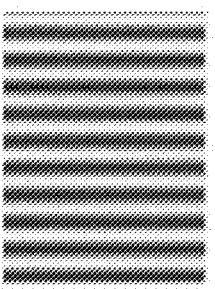
FIG. 2D is a diagram illustrating an example of a short cycle light pattern used in the three-dimensional shape measuring method according to the first example embodiment of the present invention.

FIG. 2A to FIG. 2D illustrate four sinusoidal patterns whose phases are each shifted by ¼ wavelengths as an example. Each drawing of FIG. 2A to FIG. 2D represents the luminance in a projection region of the light pattern in grayscale. In the sinusoidal pattern illustrated in each drawing of FIG. 2A to FIG. 2D, the luminance changes sinusoidally in the vertical direction of the drawing. FIG. 2A illustrates a light pattern projected at time t=0, FIG. 2B illustrates a light pattern projected at time t=π/2, FIG. 2C illustrates a light pattern projected at time t=π, and FIG. 2D illustrates a light pattern projected at time t=3π/2.

Note that a variable t is here denoted as "time", description is provided for a case of modulating the amplitude of the luminance. In implementation, a vertical displacement of the phase when the light pattern of FIG. 2A is a reference is illustrated, and the projection timing of a light pattern can be changed regardless of the actual time. The same applies to FIG. 3A and FIG. 3B described later.

When the measured object 10 on which a sinusoidal pattern is projected by the image capture device 30, a luminance value I(x, y, t) at time t at (x, y) coordinates of an obtained image is expressed as Equation (1) below, where the amplitude of a sine wave is denoted as A, the phase value is denoted as θ, and the bias (the center value of a sine wave) is denoted as B.

[Math. 1]

$$I(x,y,t)=A\cdot\cos(t+\theta)+B \qquad (1)$$

Since the light pattern projected by the projector device 20 differs in the phase value θ for each angle viewed from the projector device 20, if the phase value θ at coordinates (x, y) can be calculated, the three-dimensional position corresponding to the coordinates (x, y) can be defined.

Since Equation (1) has three unknowns of the amplitude A, the phase value θ, and the bias B, with at least three light pattern projection images, the phase value θ can be calculated. When four or more light pattern projection images are captured, the phase value θ can be calculated more accurately by using a least-squares method or the like.

Herein, if images at time t=0, time t=π/2, time t=π, and time t=3π/2 are acquired, the luminance value I(x, y, t) at the coordinates (x, y) at each time is expressed as Equation (2) to Equation (5) below.

[Math. 2]

$$I(x, y, 0) = A \cdot \cos(\theta) + B \quad (2)$$

$$I\left(x, y, \frac{\pi}{2}\right) = A \cdot \cos\left(\frac{\pi}{2} + \theta\right) + B \quad (3)$$

$$I(x, y, \pi) = A \cdot \cos(\pi + \theta) + B \quad (4)$$

$$I\left(x, y, \frac{3\pi}{2}\right) = A \cdot \cos\left(\frac{3\pi}{2} + \theta\right) + B \quad (5)$$

Equation (6) to Equation (8) below are obtained by finding the amplitude A, the phase value A, and the bias B by using a least-squares method from Equation (2) to Equation (5).

[Math. 3]

$$A = \frac{\sqrt{(I(x,y,0) - I(x,y,\pi))^2 + \left(I\left(x,y,\frac{\pi}{2}\right) - I\left(x,y,\frac{3\pi}{2}\right)\right)^2}}{2} \quad (6)$$

$$B = \frac{I(x,y,0) + I\left(x,y,\frac{\pi}{2}\right) + I(x,y,\pi) + I\left(x,y,\frac{3\pi}{2}\right)}{4} \quad (7)$$

$$\theta = \tan^{-1}\frac{-I\left(x,y,\frac{\pi}{2}\right) + I\left(x,y,\frac{3\pi}{2}\right)}{I(x,y,0) - I(x,y,\pi)} \quad (8)$$

In general, in the sinusoidal grating phase shift method, it is known from experience that resolution around 1/200 of the depth corresponding to one cycle is obtained, and accuracy of around 100 μm to 200 μm is actually obtained as an example.

Since the sine wave is a repeating function, however, the obtained phase value θ ranges from −π to π (−π≤θ≤π). Therefore, points indicating the same phase value θ may be present, the number of which is the same as the number of cycles included in a projection region of a light pattern, and coordinates cannot be uniquely defined from the obtained phase value θ. Although the use of a sinusoidal pattern where the whole screen of a captured image corresponds to one cycle can solve this uncertainty, there is a tradeoff relationship where depth measuring accuracy deteriorates accordingly. Thus, conventionally, a so-called multi-eye sinusoidal grating phase shift method in which images acquired by two image capture devices are used to solve the uncertainty is used. However, the multi-eye sinusoidal grating phase shift method uses a plurality of projectors or a plurality of image capture devices and thus has a problem of system configuration or control being more complex or the like.

In the three-dimensional shape measuring method according to the present example embodiment, two types of light patterns are used as the light pattern to be projected on the measured object 10. These two types of light patterns are periodic light patterns whose numbers of repeating cycles are different from each other, which are distinguished here as a short cycle light pattern and a long cycle light pattern. That is, the three-dimensional shape measuring method according to the present example embodiment is to perform measurement of a phase value using a long cycle light pattern in addition to measurement of a phase value using a short cycle light pattern similar to the measurement by using the sinusoidal phase shift method described above.

In the present example embodiment, a sinusoidal pattern is used as each of the short cycle light pattern and the long cycle light pattern. The short cycle light pattern is a light pattern that determines the resolution of measurement. The greater the number of cycles of the short cycle light pattern included in the whole screen of an image captured by the image capture device 30 is, the higher the resolution of measurement is. Thus, it is desirable that the short cycle light pattern be a light pattern including multiple cycles of patterns in a whole screen of a captured image, as illustrated in FIG. 2A to FIG. 2D, for example. The number of cycles of a short cycle light pattern included in the whole screen can be suitably set in accordance with resolution required for measurement. The long cycle light pattern is a light pattern used for identifying the absolute phase value Θ and desirably a light pattern including one or less cycle of pattern in the whole screen of an image captured by the image capture device 30.

As illustrated in FIG. 3A and FIG. 3B, for example, a light pattern including one cycle of pattern in the whole screen of a captured image can be applied to the long cycle light pattern. Each drawing of FIG. 3A and FIG. 3B represents the luminance in the projection region of a light pattern in grayscale in the same manner as FIG. 2A to FIG. 2D. Also in the sinusoidal pattern illustrated in FIG. 3A and FIG. 3B, the luminance changes sinusoidally in the vertical direction of the drawing. FIG. 3A illustrates a light pattern projected at time t=0, and FIG. 3B illustrates a light pattern projected at time t=π/2.

When the measured object 10 on which the short cycle light pattern is projected is captured by the image capture device 30, the luminance value I(x, y, t) at time t at (x, y) coordinates of an obtained image is expressed as Equation (1) described above, where the amplitude is denoted as A, the phase value is denoted as θ, and the bias is denoted as B.

Herein, if images at time t=0, time t=π/2, time t=π, and time t=3π/2 are acquired, the luminance value I(x, y, t) at the coordinates (x, y) is expressed as Equation (2) to Equation (5) described above. Further, Equation (6) to Equation (8) described above are obtained by finding the amplitude A, the phase value θ, and the bias B by using a least-squares method from Equation (2) to Equation (5).

On the other hand, when the measured object 10 on which the long cycle light pattern is projected is captured by the image capture device 30, the luminance value J(x, y, t) at time t at (x, y) coordinates of an obtained image is expressed as Equation (9) below, where the amplitude is denoted as A', the phase value is denoted as φ, and the bias is denoted as B'.

[Math. 4]

$$I(x,y,t) = A' \cdot \cos(t+\varphi) + B' \quad (9)$$

Herein, if images at time t=0, time t=π/2, time t=π, and time t=3π/2 are acquired, the luminance value J(x, y, t) at the coordinates (x, y) is expressed as Equation (10) to Equation (13) below.

[Math. 5]

$$J(x, y, 0) = A' \cdot \cos(\varphi) + B' \tag{10}$$

$$J\left(x, y, \frac{\pi}{2}\right) = A' \cdot \cos\left(\frac{\pi}{2} + \varphi\right) + B' \tag{11}$$

$$J(x, y, \pi) = A' \cdot \cos(\pi + \varphi) + B' \tag{12}$$

$$J\left(x, y, \frac{3\pi}{2}\right) = A' \cdot \cos\left(\frac{3\pi}{2} + \varphi\right) + B' \tag{13}$$

Equation (14) to Equation (16) below are obtained by finding the amplitude A', the phase value φ, and the bias B' by using a least-squares method from Equation (10) to Equation (13).

[Math. 6]

$$A' = \frac{\sqrt{(J(x, y, 0) - J(x, y, \pi))^2 + \left(J\left(x, y, \frac{\pi}{2}\right) - J\left(x, y, \frac{3\pi}{2}\right)\right)^2}}{2} \tag{14}$$

$$B' = \frac{J(x, y, 0) + J\left(x, y, \frac{\pi}{2}\right) + J(x, y, \pi) + J\left(x, y, \frac{3\pi}{2}\right)}{4} \tag{15}$$

$$\varphi = \tan^{-1} \frac{-J\left(x, y, \frac{\pi}{2}\right) + J\left(x, y, \frac{3\pi}{2}\right)}{J(x, y, 0) - J(x, y, \pi)} \tag{16}$$

In general, in the sinusoidal grating phase shift method, it is known from experience that resolution around 1/200 of the depth corresponding to a width of one cycle is obtained. In the case of four-time capturing as described above, when the design strategy is directed to the ability of determining the absolute phase at a high certainty degree is a design strategy, the absolute phase value can be determined from the relative phase value found from around ±3σ, that is, $(6/200)^{-1}$, namely, around 33 repeating sine waves.

Herein, when a projector that can project any light pattern, such as a liquid crystal projector or a DLP projector is used as the projector device 20, it is possible to switch a short cycle light pattern and a long cycle light pattern at a high rate for projection by using a single projector device 20. Then, when the short cycle light pattern and the long cycle light pattern generated based on the light emitted from the same light source from the single projector device 20 are projected, it can be assumed that the basic physical characteristics of the projector device 20 at projection of these light patterns are the same. That is, when projection on the measured object 10 of the short cycle light pattern and the long cycle light pattern is performed by using the same projector device 20, it is considered that Equation (17) below is met.

$$A = A', B = B' \tag{17}$$

Therefore, Equation (9) can be rewritten as Equation (18) and Equation (19) below, and the number of unknowns is not three, namely, the amplitude A', the phase value φ, and the bias B' but is one, namely, only the phase value φ. Accordingly, with at least only one time of capturing the measured object 10 on which the long cycle light pattern is projected, the phase value φ can be found.

[Math. 7]

$$J(x, y, 0) = A \cdot \cos(\varphi) + B \tag{18}$$

$$\varphi = \cos^{-1} \frac{J(x, y, 0) - B}{A} \tag{19}$$

In view of the above, in the present example embodiment, the short cycle light pattern and the long cycle light pattern emitted from the single projector device 20 are projected on the measured object 10, which makes it possible to calculate the phase value φ while reducing the number of times of projection on the measured object 10. Accordingly, the three-dimensional shape of the measured object 10 can be measured in a short time.

By performing two times of capturing the measured object 10 on which the long cycle light pattern is projected and finding the phase value φ by a least-squares method, it is possible to improve the measurement accuracy of the phase value φ. Also in such a case, since the number of capturing times is reduced compared to the conventional method that requires at least three times of capturing, the measurement time of the three-dimensional shape of the measured object 10 can be reduced.

When two times of capturing are performed with a shift of a half cycle, that is, if images at time t=0 and time t=π are obtained, respectively, a luminance value J(x, y, t) at the coordinates (x, y) is expressed by Equation (20) and Equation (21) below.

[Math. 8]

$$I(x,y,0) = A' \cdot \cos(\varphi) + B' \tag{20}$$

$$I(x,y,\pi) = A' \cdot \cos(\pi + \varphi) + B' \tag{21}$$

By finding the phase value φ from Equation (20) and Equation (21) by a least-squares method, Equation (22) below is obtained.

[Math. 9]

$$\varphi = \cos^{-1} \frac{J(x, y, 0) - J(x, y, \pi)}{2A} \tag{22}$$

It should be noted, however, that the uncertainty of the phase value φ obtained by Equation (19) and Equation (22) is not a fraction divided from 2π by an integer but a fraction divided from π by an integer (the range of the obtained phase value φ is 0 φ≤π). That is, it is required to project sine waves so that the whole image corresponds not to one cycle but to a half cycle. This means that the relative error of the phase value φ becomes two times.

In order that the phase value φ can be used in a range of 2π, Equation (19) or Equation (22) used for finding the phase value φ needs to be rewritten to be not a cosine function but an inverse function of a tangent function. When capturing with a shift of ¼ cycles, that is, two-time capturing at time t=0 and time t=π/2 is assumed, the luminance value J(x, y, t) at the coordinates (x, y) is expressed by Equation (23) and Equation (24) below.

[Math. 10]

$$J(x, y, 0) = A' \cdot \cos(\varphi) + B' \quad (23)$$

$$J\left(x, y, \frac{\pi}{2}\right) = A' \cdot \cos\left(\frac{\pi}{2} + \varphi\right) + B' \quad (24)$$

By finding the phase value $\varphi$ from Equation (23) and Equation (24) by a least-squares method, Equation (25) below is obtained. The uncertainty of the phase value $\varphi$ obtained therefrom is a fraction divided from $2\pi$ by an integer (the range of the obtained phase value $\varphi$ is $-\pi \leq \varphi \leq \pi$).

[Math. 11]

$$\varphi = \tan^{-1} \frac{-J\left(x, y, \frac{\pi}{2}\right) + B}{J(x, y, 0) - B} \quad (25)$$

Note that the phase value of the long cycle light pattern to be projected changes gradually in the whole image and thus is expected to have a good compatibility with noise removal such as smoothing or a median filter. With design to have the same absolute phase determination accuracy as that when four-time capturing is performed, it is possible to cancel the disadvantage caused by a reduction of the number of capturing times.

The phase value θ becomes a value for every one cycle of the short cycle light pattern, that is, a value from $-\pi$ to $\pi$. Therefore, to find an absolute phase value in a light pattern projected for multiple cycles, a process of estimating where a pattern of the order n (a value indicating the n-th cycle counted from one end to the other end) is located on each captured image is required. In the present example embodiment, the phase value $\varphi$ is used for the estimation of the order n of a short cycle light pattern.

FIG. 4 is a graph illustrating an example of the relationship between the relative phase value (the phase value θ and the phase value $\varphi$) and the order n of a short cycle light pattern when the short cycle light pattern within a screen includes 10 cycles and the long cycle light pattern has one cycle.

As illustrated in FIG. 4, the order n of the short cycle light pattern can be determined uniquely in accordance with a value of the phase value $\varphi$. For example, the order n of a short cycle light pattern is two in a range of the phase value $\varphi$ being $\pi/5$ to $2\pi/5$, and the order n of a short cycle light pattern is seven in a range of the phase value $\varphi$ being $-4\pi/5$ to $-3\pi/5$.

With the order n of the short cycle light pattern being found, the absolute phase value $\Theta$ (=θ+2π(n-1)) can be calculated from the phase value θ and the order n. The line obtained by connecting points having the same absolute phase value $\Theta$ on a captured image (equal phase line) represents a shape of a cross section of the measured object 10 taken along a certain plane similar to a sectional line by a light-section method. Based on this absolute phase value $\Theta$, the three-dimensional shape of the measured object 10 (height information at each point of an image) can be measured by a triangulation principle. That is, it is possible to identify the three-dimensional shape of the measured object 10 by finding the absolute coordinate value of a projection point on the measured object in a three-dimensional space corresponding to each pixel on an image by a triangulation principle based on the absolute phase value $\Theta$ and the optical arrangement of the projector device 20 and the image capture device 30.

Since the three-dimensional shape measuring method of the present example embodiment uses two light patterns, namely, the short cycle light pattern and the long cycle light pattern, the capturing time is longer than in the case where one type of the light pattern is used. However, with a use of a DLP projector, a liquid crystal projector, or the like for projection of a light pattern, the capturing time can be sufficiently reduced for the absolute time. Further, according to the three-dimensional shape measuring method of the present example embodiment, it is expected to solve the problems of long calculation time of three-dimensional coordinates and inability of measurement if the positional relationship between the camera and the projector on the left and right becomes wrong, which are disadvantages of the multi-eye sinusoidal grating phase shift method described above.

Further, in the conventional method, when two light patterns, namely, the short cycle light pattern and the long cycle light pattern are used, projection and capturing of the light patterns are required to be performed for at least three times, respectively, that is, six times in total. In contrast, in the three-dimensional shape measuring method according to the present example embodiment, projection and capturing of the light patterns need to be performed only for at least three times by using the short cycle light pattern and one time by using the long cycle light pattern, that is, four times in total. Therefore, according to the three-dimensional shape measuring method of the present example embodiment, the number of images to be projected can be reduced, and the capturing time can be shortened.

Note that, although measurement using a short cycle light pattern is performed earlier and the amplitude A and the bias B are calculated in the above description, measurement using a long cycle light pattern may be performed earlier and the amplitude A' and the bias B' may be calculated.

The three-dimensional shape measuring method according to the present example embodiment can be performed in accordance with step S101 to step S116 illustrated in FIG. 5, for example. Note that description is provided here for a case of calculating the amplitude A, the bias B, and the phase value θ from an image of the measured object 10 on which the first light pattern, which is the short cycle light pattern, is projected and calculating the phase value $\varphi$ from an image of the measured object 10 on which the second light pattern, which is the long cycle light pattern, is projected, as an example. However, the amplitude A', the bias B', and the phase value $\varphi$ may be calculated from an image of the measured object 10 on which the first light pattern, which is the long cycle light pattern, is projected and calculate the phase value θ from an image of the measured object 10 on which the second light pattern, which is the short cycle light pattern, is projected. Projection of the second light pattern may be performed earlier than projection of the first light pattern.

First, in step S101, the number of projection times L for the first light pattern is set. Measurement using the first light pattern is for determining the amplitude A, the bias B, and the phase value θ, and the number of projection times L is greater than or equal to three. To perform more accurate measurement by using a least-squares method or the like, it is desirable that the number of projection times L be greater than or equal to four. As an example here, the number of projection times L for the first light pattern is four.

Next, in step S102, under the control of the projection pattern control unit 42, the projector device 20 projects the first light pattern on the measured object 10 to be measured. As an example here, the first light pattern, which is the short cycle light pattern, is projected on the measured object 10. The pattern of FIG. 2A is applicable as the short cycle light pattern, for example.

Next, in step S103, under the control of the image acquisition unit 44, the image capture device 30 captures an image of the measured object 10 on which the first light pattern is projected.

Next, in step S104, the number of projection times L for the first light pattern is decremented by one. The number of projection times L represents the number of remaining projection times of the first light pattern.

Next, in step S105, it is determined whether or not the number of projection times L of the first light pattern is zero, that is, whether or not the projection and capturing of the first light pattern have been performed for the number of projection times L set in step S101.

As a result of the determination of step S105, if the number of projection times L is not zero (step S105, "No"), in step S106, the phase of the first light pattern projected on the measured object 10 is shifted, and the process returns to step S102. For example, when the number of projection times L is four, the projection pattern control unit 42 sequentially prepares data of the short cycle light patterns having phases shifted stepwise by ¼ wavelengths (see FIG. 2B, FIG. 2C, and FIG. 2D) and transmits the data to the projector device 20.

As a result of the determination in step S105, if the number of projection times L is zero (step S105, "Yes"), the process proceeds to step S107.

Next, in step S107, the relative phase value calculation unit 46 calculates the amplitude A, the bias B, and the phase value θ, respectively, based on the luminance value I of each pixel of the L images captured in step S103. The amplitude A, the bias B, and the phase value θ can be calculated based on Equation (6) to Equation (8), for example.

Next, in step S108, the number of projection times M for the second light pattern is set. Measurement using the second light pattern is for determining the phase value φ, and the number of projection times M is greater than or equal to one. To perform more accurate measurement by using a least-squares method or the like, it is desirable that the number of projection times M be greater than or equal to two. As an example here, the number of projection times M for the second light pattern is two.

Next, in step S109, under the control of the projection pattern control unit 42, the projector device 20 projects the second light pattern on the measured object 10 to be measured. As an example here, the second light pattern that is the long cycle light pattern is projected on the measured object 10. The pattern of FIG. 3A is applicable as the long cycle light pattern, for example.

Next, in step S110, under the control of the image acquisition unit 44, the image capture device 30 captures an image of the measured object 10 on which the second light pattern is projected.

Next, in step S111, the number of projection times M for the second light pattern is decremented by one. The number of projection times M represents the number of remaining projection times of the second light pattern.

Next, in step S112, it is determined whether or not the number of projection times M of the second light pattern is zero, that is, whether or not the projection and capturing of the second light pattern have been performed for the number of projection times M set in step S108.

As a result of the determination of step S112, if the number of projection times M is not zero (step S112, "No"), in step S113, the phase of the second light pattern projected on the measured object 10 is shifted, and the process returns to step S109. For example, when the number of projection times M is two, the projection pattern control unit 42 prepares data of the long cycle light patterns having phases shifted stepwise by ¼ wavelengths (see FIG. 3B) and transmits the data to the projector device 20.

As a result of the determination in step S112, if the number of projection times M is zero (step S112, "Yes"), the process proceeds to step S114.

Next, in step S114, the relative phase value calculation unit 46 calculates the phase value φ based on the amplitude A and the bias B calculated in step S107 and the luminance value J of each pixel of the M images captured in step S110, respectively. The phase value φ can be calculated based on Equation (25), for example.

Next, in step S115, the absolute phase value calculation unit 48 calculates the absolute phase value Θ based on the phase value θ calculated in step S107 and the phase value φ calculated in step S114.

Next, in step S116, based on the absolute phase value Θ calculated in step S115, the three-dimensional coordinate calculation unit 50 calculates the absolute coordinate values of the projection point on the measured object 10 in the three-dimensional space corresponding to each pixel of the captured image. Accordingly, the three-dimensional shape of the measured object 10 can be identified.

As described above, the three-dimensional measuring method according to the present example embodiment can measure the three-dimensional shape of a measured object by performing projection and capturing of light patterns for at least three times using the short cycle light pattern and once using the long cycle light pattern, namely, four times in total. Therefore, the three-dimensional measuring method according to the present example embodiment can reduce the number of projected images and thus can shorten the measuring time compared to the conventional method that requires projection and capturing of light patterns for at least three times using the short cycle light pattern and three times using the long cycle light pattern, namely, six times in total. It is required to complete the measurement in a short time when a three-dimensional shape of a moving measured target is measured, in particular, such as when face authentication of a person is performed, for example. The three-dimensional measuring method according to the present example embodiment that enables accurate measurement within a shorter measuring time is significantly useful in accurately performing face authentication with a moving image, for example.

Further, the three-dimensional measuring method according to the present example embodiment can perform projection of the short cycle light pattern and projection of the long cycle light pattern by using a single projector device and perform capturing a light pattern projected on a measured object by using a single image capture device. Therefore, with the three-dimensional measuring apparatus according to the present example embodiment, it is possible to simplify the system configuration or control compared to the conventional method using a plurality of projector devices or image capture devices.

Therefore, according to the present example embodiment, it is possible to realize the three-dimensional shape measuring method and apparatus that may measure a three-dimensional shape of an object at high accuracy and in a short time with a simpler system.

Second Example Embodiment

A three-dimensional shape measuring apparatus and a three-dimensional shape measuring method according to a second example embodiment of the present invention will be described with reference to FIG. 6A to FIG. 9B. The same components as those of the three-dimensional shape measuring apparatus according to the first example embodiment will be labeled with the same references, and the description thereof will be omitted or simplified.

Figure 6A:
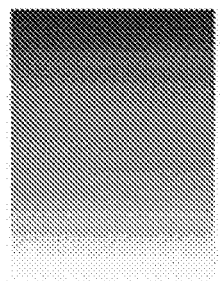
FIG. 6A is a diagram illustrating an example of a long cycle light pattern used in a three-dimensional shape measuring method according to a second example embodiment of the present invention.
Figure 6B:
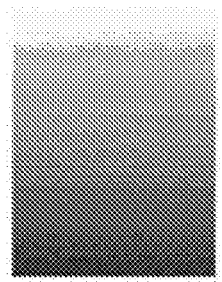
FIG. 6B is a diagram illustrating an example of a long cycle light pattern used in a three-dimensional shape measuring method according to the second example embodiment of the present invention.
Figure 7:
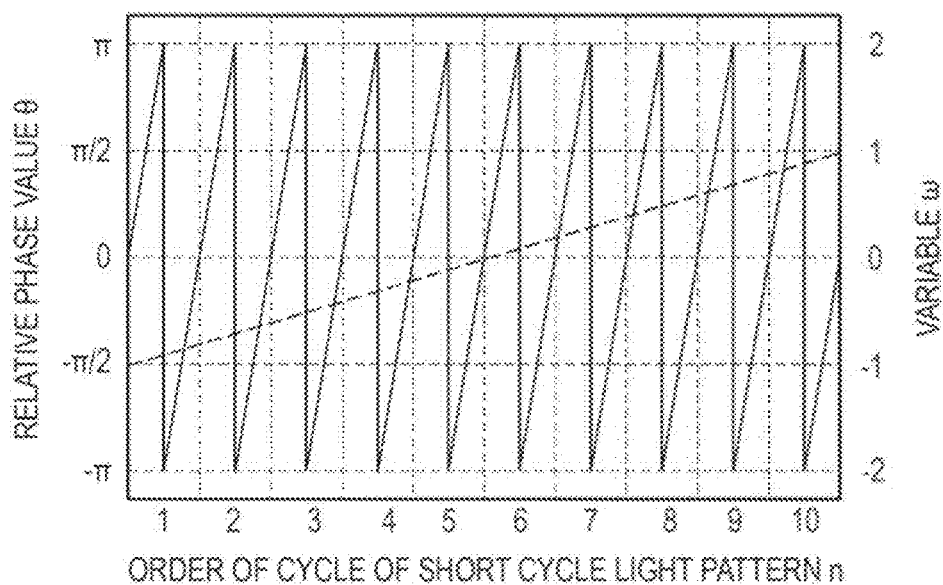
FIG. 7 is a graph illustrating a method of capturing an absolute phase value in the three-dimensional shape measuring method according to the second example embodiment of the present invention.
Figure 8:
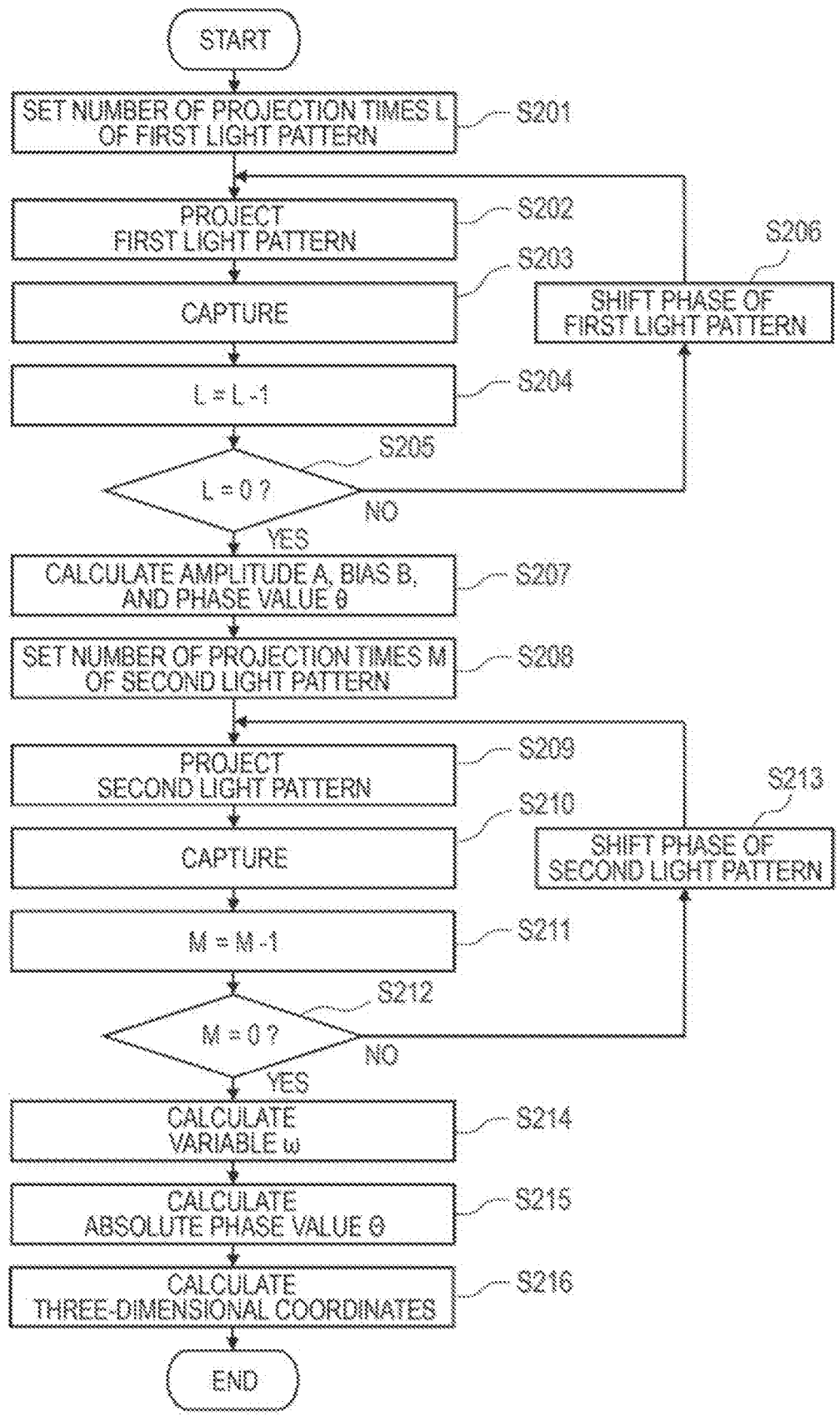
FIG. 8 is a flowchart illustrating the three-dimensional shape measuring method according to the second example embodiment of the present invention.
Figure 9A:
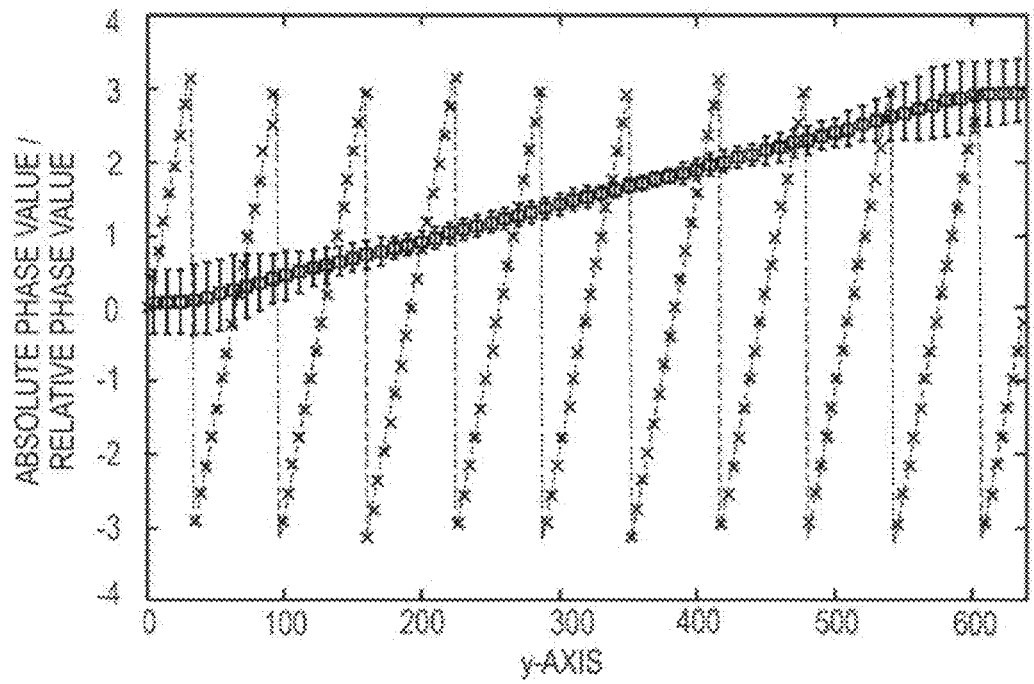
FIG. 9A is a graph illustrating a result of inspection of an advantageous effect of the present invention inspected through a computer simulation.
Figure 9B:
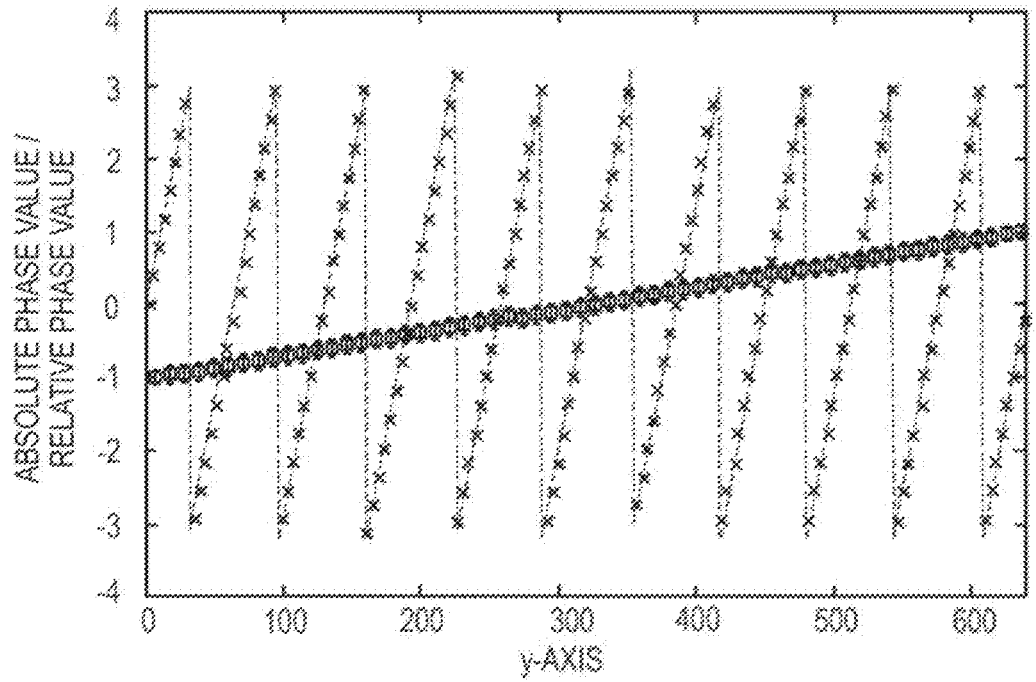
FIG. 9B is a graph illustrating a result of inspection of an advantageous effect of the present invention inspected through a computer simulation.

FIG. 6A and FIG. 6B are diagrams illustrating examples of a long cycle light pattern used in the three-dimensional shape measuring method according to the present example embodiment. FIG. 7 is a graph illustrating a calculation method of an absolute phase value in the three-dimensional shape measuring method according to the present example embodiment. FIG. 8 is a flowchart illustrating the three-dimensional shape measuring method according to the present example embodiment. FIG. 9A and FIG. 9B are graphs illustrating results of inspection of an advantageous effect of the present invention through a computer simulation.

Although the sinusoidal pattern is used as a short cycle light pattern and a long cycle light pattern in the first example embodiment, the short cycle light pattern and the long cycle light pattern are not necessarily required to be a sinusoidal pattern and may be another periodic pattern. In particular, various periodic patterns are applicable to the long cycle light pattern, because it is sufficient that the position is uniquely defined on the whole screen. In the present example embodiment, as an example of the above, a case where a sinusoidal pattern is used as the short cycle light pattern and a luminance slope pattern is used as the long cycle light pattern will be described.

Since the derivative near the maximum value and the minimum value of a sine wave is close to zero, there is a high likelihood that substantially the same luminance values are projected at adjacent angles. In fact, when 640 pixels, which is a common size of a camera image, are projected at 256 levels, which is a common luminance quantized level of a camera or a projector, an error near the maximum value or the minimum value of the sine wave increases if the number of projecting light patterns is reduced as with the present invention.

To avoid such a problem and remove dependency on a projection angle, it is effective to use a luminance slope pattern whose derivative is constant, that is, whose luminance value changes linearly at a fixed ratio. Accordingly, in the present example embodiment, the luminance slope pattern is applied as a long cycle light pattern. FIG. 6A and FIG. 6B each illustrate an example of the luminance slope pattern. FIG. 6A illustrates a luminance slope pattern in which the luminance increases at a fixed ratio from the upper part toward the lower part, and FIG. 6B illustrates a luminance slope pattern in which the luminance decreases at a fixed ratio from the upper part toward the lower part.

When the measured object 10 on which a luminance slope pattern is projected is captured by the image capture device 30, the luminance value K(x, y, t) at time t at (x, y) coordinates of an obtained image is expressed as Equation (26) below. Herein, A" denotes an amplitude, B" denotes a bias, and ω is a variable that changes linearly within a range $-1 \leq \omega \leq 1$.

[Math. 12]

$$K(x,y,t) = A'' \cdot (-(2t-1) \cdot \omega) + B'' \tag{26}$$

Also when the luminance slope pattern is used, Equation (27) below is met when the same projector device 20 is used for the short cycle light pattern and the long cycle light pattern. Therefore, if the measured object 10 on which the long cycle light pattern is projected is captured at least once only, the phase value φ can be found.

$$A = A'', B = B'' \tag{27}$$

In the same manner as the case of the first example embodiment, when the measured object 10 on which the luminance slope pattern is projected is captured once only, the luminance value K(x, y, t) and the variable ω are expressed by Equation (28) and Equation (29).

[Math. 13]

$$K(x, y, 0) = A \cdot \omega + B \tag{28}$$

$$\omega = \frac{K(x, y, 0) - B}{A} \tag{29}$$

Further, it is possible to perform twice the capturing of the measured object 10 on which the luminance slope pattern is projected and find the variable ω by using a least-squares method. That is, if images at time t=0 and time t=1 are obtained, respectively, the luminance value K(x, y, t) at coordinates (x, y) is expressed by Equation (30) and Equation (31) below. The variable ω is then expressed by Equation (32) below.

[Math. 14]

$$K(x, y, 0) = A \cdot \omega + B \tag{30}$$

$$K(x, y, 1) = -A \cdot \omega + B \tag{31}$$

$$\omega = \frac{K(x, y, 0) - K(x, y, 1)}{2A} \tag{32}$$

The variable ω changes gradually in the whole screen and thus is expected to have a good compatibility with noise removal such as smoothing or a median filter. With design to have the same absolute phase determination accuracy as that when four-time capturing is performed, it may be possible to cancel the disadvantage caused by a reduction of the number of capturing times. Further, unlike the phase value, since the variable ω is not a periodic value in a strict sense, a classical noise removal process can be utilized without change.

FIG. 7 is a graph illustrating a relationship between the relative phase value (phase value θ) and the variable ω with respect to the order n of the short cycle light pattern when the short cycle light pattern includes 10 cycles and the long cycle light pattern (luminance slope pattern) includes 1 cycle within a screen.

As illustrated in FIG. 7, the order n of the short cycle light pattern can be defined uniquely in accordance with the value of the variable ω. For example, the order n of the short cycle light pattern is 2 in a range of the variable ω from −0.8 to −0.6, and the order n of the short cycle light pattern is 7 in a range of the variable ω from 0.2 to 0.4.

With the order n of the short cycle light pattern being found, the absolute phase value Θ (=θ+2π(n−1)) can be calculated from the phase value θ and the order n. A line obtained by connecting points having the same absolute phase value Θ on the captured image (equal-phase line)

represents the shape of a cross section of the measured object 10 taken along a certain plane in a similar manner to a sectional line by a light-section method. Based on this absolute phase value Θ, the three-dimensional shape of the measured object 10 (height information at each point of an image) can be measured by a triangulation principle. That is, it is possible to identify the three-dimensional shape of the measured object 10 by finding absolute coordinate value of a projection point on the measured object in a three-dimensional space corresponding to each pixel on an image by a triangulation principle based on the absolute phase value Θ and the optical arrangement of the projector device 20 and the image capture device 30.

The three-dimensional shape measuring method according to the present example embodiment can be performed in accordance with step S201 to step S216 illustrated in FIG. 8, for example. Note that description is provided here for a case of calculating the amplitude A, the bias B, and the phase value θ from an image of the measured object 10 on which the first light pattern, which is the short cycle light pattern, is projected and calculating the phase value φ from an image of the measured object 10 on which the second light pattern, which is the long cycle light pattern, is projected as an example. However, the amplitude A', the bias B', and the phase value φ may be calculated from an image of the measured object 10 on which the first light pattern that is the long cycle light pattern is projected and calculate the phase value θ from an image of the measured object 10 on which the second light pattern, which is the short cycle light pattern, is projected. Projection of the second light pattern may be performed earlier than projection of the first light pattern.

First, in the same manner as step S101 to step S107 of the three-dimensional shape measuring method according to the first example embodiment, measurement using the first light pattern (short cycle light pattern) is performed. Thereby, based on the luminance value I of each pixel of L captured images, the amplitude A, the bias B, and the phase value θ are calculated, respectively (step S201 to step S207).

Next, in step S208, the number of projection times M for the second light pattern (the luminance slope pattern) is set. Measurement using the second light pattern is for determining the variable ω, and the number of projection times M is greater than or equal to one. To perform more accurate measurement by using a least-squares method or the like, it is desirable that the number of projection times M be greater than or equal to two. As an example here, the number of projection times M for the second light pattern is two.

Next, in step S209, under the control of the projection pattern control unit 42, the projector device 20 projects the second light pattern, which is the luminance slope pattern, on the measured object 10. The pattern of FIG. 6A is applicable as the luminance slope pattern, for example.

Next, in step S210, under the control of the image acquisition unit 44, the image capture device 30 captures an image of the measured object 10 on which the second light pattern is projected.

Next, in step S211, the number of projection times M for the second light pattern is decremented by one. The number of projection times M represents the number of remaining projection times of the second light pattern.

Next, in step S212, it is determined whether or not the number of projection times M of the second light pattern is zero, that is, whether or not the projection and capturing of the second light pattern have been performed for the number of projection times M set in step S208.

As a result of the determination of step S212, if the number of projection times M is not zero (step S212, "No"), in step S213, the phase of the second pattern projected on the measured object 10 is shifted, and the process returns to step S209. For example, when the number of projection times M is two, the projection pattern control unit 42 sequentially prepares data of the luminance slope patterns having an inversed luminance slope (see FIG. 6B) and transmits the data to the projector device 20.

As a result of the determination in step S212, if the number of projection times M is zero (step S212, "Yes"), the process proceeds to step S214.

Next, in step S214, the relative phase value calculation unit 46 calculates the variable ω based on the amplitude A and the bias B calculated in step S207 and the luminance value K of each pixel of the M images captured in step S210, respectively. The variable ω can be calculated based on Equation (32), for example.

Next, in step S215, the absolute phase value calculation unit 48 calculates the absolute phase value Θ based on the phase value θ calculated in step S207 and the variable ω calculated in step S214.

Next, in step S216, based on the absolute phase value Θ calculated in step S215, the three-dimensional coordinate calculation unit 50 calculates the absolute coordinate values of the projection point on the measured object 10 in the three-dimensional space corresponding to each pixel of the captured image. Accordingly, the three-dimensional shape of the measured object 10 can be identified.

FIG. 9A and FIG. 9B each illustrate a result of inspection of the advantageous effect of the present invention through a computer simulation. FIG. 9A illustrates a case of the first example embodiment in which sinusoidal patterns are used as the short cycle light pattern and the long cycle light pattern, and FIG. 9B illustrates a case of the present example embodiment in which a sinusoidal pattern is used as the short cycle light pattern and a luminance slope pattern is used as the long cycle light pattern. In both the cases, it is assumed that the number of projection times of the long cycle light pattern is two.

In the computer simulation, after a sinusoidal pattern or a luminance slope pattern having the amplitude A=64 and the bias B=127 was generated as an image of 480×640 pixels as a target, normalized noise having a mean of 0 and a standard deviation of σ=3 was superimposed thereon, which was quantized within a range of 0 to 255. A sine wave used for the shape measurement was 10-time repetition pattern (see FIG. 2A to FIG. 2D), and a sine wave used for the absolute phase determination was a half-cycle pattern. In the drawing, the plots x represent the short cycle light pattern and are illustrated together with an error bar of the range of the standard deviation σ. Further, the plots □ represent the long cycle light pattern and are illustrated together with an error bar of the range of three times the standard deviation σ.

When a sinusoidal pattern is used as a long cycle light pattern, it can be seen that the accuracy related to determination of the absolute phase value significantly drops near the point at which the derivative of the long cycle light pattern is zero, as illustrated in FIG. 9A. It can be seen that, when σ is 3, the six-time range maximum value of the phase estimation accuracy with a long cycle sinusoidal grating is 33.0% and it will be difficult to determine the absolute phase unless the cycle of the short cycle sinusoidal grating is decreased to around three cycles within a screen. As described previously, since the derivative near the maximum value and the minimum value of a sine wave is close to zero, there is a high likelihood that substantially the same luminance values are projected at adjacent angles. When the number of projection times of a light pattern is reduced as with the present invention, the error around the maximum value and the minimum value of a sine wave increases.

On the other hand, when a luminance slope pattern is used as a long cycle light pattern, it can be seen that the accuracy related to determination of the absolute phase value is constant independently of the position as illustrated in FIG. 9B and is significantly improved as a whole compared to the case of FIG. 9A. When σ is 3, it can be seen that the six-time range maximum value of the phase estimation accuracy with a long cycle sinusoidal grating is 4.5% and the cycle of the short cycle sinusoidal grating can be increased up to around 20 cycles within the screen. In such a way, by applying a luminance slope pattern as a long cycle light pattern, it is possible to reduce a projection angle dependency of a measurement error, which enables more accurate measurement.

As described above, in the three-dimensional measuring method according to the present example embodiment, since the luminance slope pattern is used as the long cycle light pattern, a measurement error can be reduced compared to the three-dimensional measuring method according to the first example embodiment using a sinusoidal pattern as a long cycle pattern.

Accordingly, in addition that the advantageous effect provided by the first example embodiment is provided, measurement accuracy can be further improved.

Therefore, according to the present example embodiment, it is possible to realize the three-dimensional shape measuring method and apparatus that may measure the three-dimensional shape of an object at high accuracy and in a short time with a simpler system.

Third Example Embodiment

Figure 10:
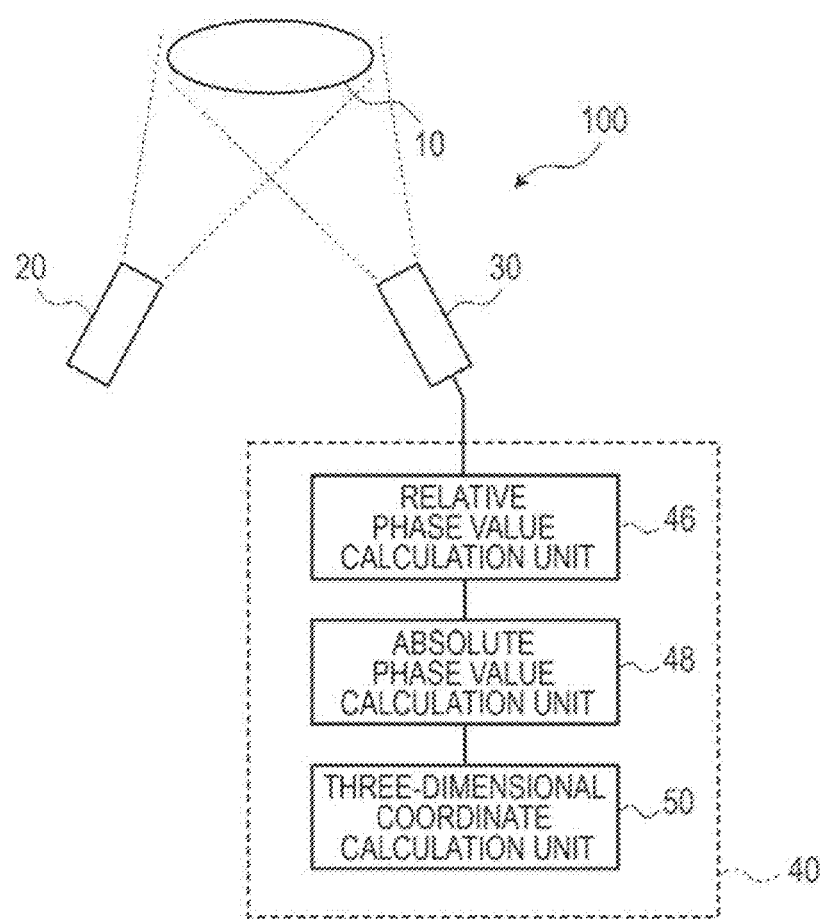
FIG. 10 is a schematic diagram illustrating a configuration example of a three-dimensional shape measuring apparatus according to a third example embodiment of the present invention.

A three-dimensional shape measuring apparatus according to a third example embodiment of the present invention will be described with reference to FIG. 10. The same components as those of the three-dimensional shape measuring apparatus according to the first and second example embodiments will be labeled with the same references, and the description thereof will be omitted or simplified. FIG. 10 is a schematic diagram illustrating a configuration example of the three-dimensional shape measuring apparatus according to the present example embodiment.

The three-dimensional shape measuring apparatus according to the first and second example embodiments can be configured as illustrated FIG. 10, for example. That is, the three-dimensional shape measuring apparatus 100 according to the present example embodiment has a single projector device 20 that projects a first light pattern whose luminance changes at a first cycle and a second light pattern whose luminance changes at a second cycle that is longer than the first cycle on the measured object 10. Further, the three-dimensional shape measuring apparatus 100 has the image capture device 30 that acquires an image of the measured object 10 on which the first light pattern or the second light pattern is projected and the image processing device 40 that processes an image acquired by the image capture device 30. The image processing device 40 has the relative phase value calculation unit 46 that, based on a luminance value at each pixel of an image of the measured object 10 on which the first light pattern is projected, calculates a relative phase value on each part of the measured object 10 corresponding to each pixel. Further, the image processing device 40 has the absolute phase value calculation unit 48 that, based on the luminance value and the relative phase value at each pixel of an image of the measured object 10 on which the second light pattern is projected, calculates an absolute phase value at each part of the measured object 10 corresponding to each of the pixels. Further, the image processing device 40 has the three-dimensional coordinate calculation unit 50 that calculates three-dimensional coordinates on each part of the measured object 10 corresponding to each pixel based on the absolute phase value.

With the above configuration, it is possible to realize the three-dimensional shape measuring method and apparatus that may measure the three-dimensional shape of an object at high accuracy and in a short time with a simpler system.

Modified Example Embodiments

Various modifications can be made to the present invention without being limited to the example embodiments described above.

For example, an example embodiment in which a part of the configuration of any of the example embodiments is added to another example embodiment or an example embodiment in which a part of the configuration of any of the example embodiments is replaced with a part of the configuration of another example embodiment is one of the example embodiments of the present invention.

Figure 11A:
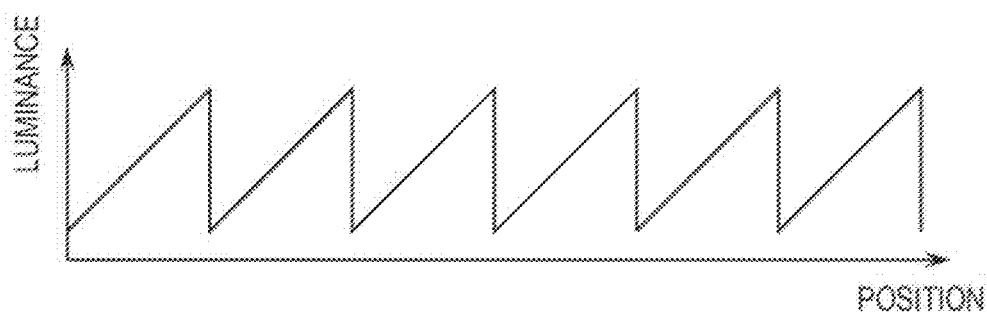
FIG. 11A is a diagram illustrating an example of a light pattern according to a modified example of the example embodiment of the present invention.
Figure 11B:
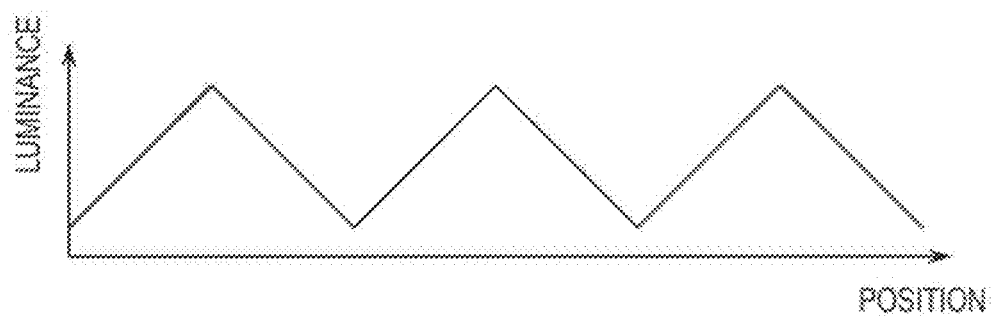
FIG. 11B is a diagram illustrating an example of a light pattern according to a modified example of the example embodiment of the present invention.

Further, although the sinusoidal pattern has been illustrated as a periodic light pattern as an example in the above first and second example embodiments, the periodic light pattern is not limited to a sinusoidal pattern. For example, a periodic light pattern may be a saw-tooth wave pattern as illustrated in FIG. 11A or may be a triangular wave pattern as illustrated in FIG. 11B. It can be said that the luminance slope pattern illustrated in the second example embodiment is a waveform of one cycle of the saw-tooth wave pattern illustrated in FIG. 11A or a waveform of a half cycle of the triangular wave pattern illustrated in FIG. 11B. In view of the above, in the present specification, the luminance slope pattern is handled as one of the periodic light patterns.

Further, although an object that is moving has been illustrated as an example of the measured object 10 in the above example embodiments, the three-dimensional shape measuring method and apparatus described in the above example embodiments can be applied to measurement of the shape of various objects, and the measured object 10 is not limited to a moving object.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

Note that all the example embodiments described above are mere examples of embodiment in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

A three-dimensional shape measuring apparatus comprising:
- a single projector device that projects a first light pattern whose luminance changes at a first cycle and a second light pattern whose luminance changes at a second cycle that is longer than the first cycle on a measured object;
- an image capture device that acquires an image of the measured object on which the first light pattern or the second light pattern is projected; and
- an image processing device that processes the image acquired by the image capture device,
- wherein the image processing device includes
  - a relative phase value calculation unit that, based on a luminance value at each of pixels of an image of the measured object on which the first light pattern is projected, calculates a relative phase value on each part of the measured object corresponding to each of the pixels,
  - an absolute phase value calculation unit that, based on a luminance value and the relative phase value at each of pixels of an image of the measured object on which the second light pattern is projected, calculates an absolute phase value on each the part of the measured object corresponding to each of the pixels, and
  - a three-dimensional coordinate calculation unit that, based on the absolute phase value, calculates three-dimensional coordinates at each the part of the measured object corresponding to each of the pixels.

(Supplementary Note 2)

The three-dimensional shape measuring apparatus according to supplementary note 1, wherein the image capture device acquires at least three images captured with different phases of the first light pattern projected on the measured object and acquires one image in which the measured object on which the second light pattern is projected is captured or two images captured with different phases of the second light pattern projected on the measured object.

(Supplementary Note 3)

The three-dimensional shape measuring apparatus according to supplementary note 1 or 2, wherein the first light pattern is a sinusoidal pattern.

(Supplementary Note 4)

The three-dimensional shape measuring apparatus according to any one of supplementary notes 1 to 3, wherein the second light pattern is a sinusoidal pattern.

(Supplementary Note 5)

The three-dimensional shape measuring apparatus according to any one of supplementary notes 1 to 3, wherein the second light pattern is a luminance slope pattern whose luminance changes linearly.

(Supplementary Note 6)

The three-dimensional shape measuring apparatus according to supplementary note 4 or 5, wherein the second light pattern is a pattern by which a whole screen of the image corresponds to one cycle.

(Supplementary Note 7)

The three-dimensional shape measuring apparatus according to any one of supplementary notes 1 to 6, wherein the projector device generates the first light pattern and the second light pattern from a light emitted from a single light source.

(Supplementary Note 8)

The three-dimensional shape measuring apparatus according to any one of supplementary notes 1 to 7, wherein the projector device is a DLP projector or a liquid crystal projector.

(Supplementary Note 9)

The three-dimensional shape measuring apparatus according to any one of supplementary notes 1 to 8, wherein the measured object is a moving object.

(Supplementary Note 10)

The three-dimensional shape measuring apparatus according to supplementary note 9, wherein the moving object is a face of a person.

(Supplementary Note 11)

A three-dimensional shape measuring method comprising the steps of:
- projecting a first light pattern whose luminance changes at a first cycle on a measured object and acquiring an image of the measured object on which the first light pattern is projected;
- projecting a second light pattern whose luminance changes at a second cycle that is longer than the first cycle on the measured object by the same projector device as a projector device used for projection of the first light pattern and acquiring an image of the measured object on which the second light pattern is projected;
- based on a luminance value at each of pixels of an image of the measured object on which the first light pattern is projected, calculating a relative phase value on each part of the measured object corresponding to each of the pixels;
- based on a luminance value and the relative phase value at each of pixels of an image of the measured object on which the second light pattern is projected, calculating an absolute phase value on each the part of the measured object corresponding to each of the pixels; and
- based on the absolute phase value, calculating three-dimensional coordinates at each the part of the measured object corresponding to each of the pixels.

(Supplementary Note 12)

The three-dimensional shape measuring method according to supplementary note 11,
- wherein in the step of acquiring an image of the measured object on which the first light pattern is projected, at least three images captured with different phases of the first light pattern projected on the measured object are acquired, and
- wherein in the step of acquiring an image of the measured object on which the second light pattern is projected, one image in which the measured object on which the second light pattern is projected is captured or two images captured with different phases of the second light pattern projected on the measured object are acquired.

(Supplementary Note 13)

The three-dimensional shape measuring method according to supplementary note 11 or 12, wherein the first light pattern is a sinusoidal pattern.

(Supplementary Note 14)

The three-dimensional shape measuring method according to any one of supplementary notes 11 to 13, wherein the second light pattern is a sinusoidal pattern.

(Supplementary Note 15)

The three-dimensional shape measuring method according to any one of supplementary notes 11 to 13, wherein the second light pattern is a luminance slope pattern whose luminance changes linearly.

(Supplementary Note 16)

The three-dimensional shape measuring method according to supplementary note 14 or 15, wherein the second light pattern is a pattern by which a whole screen of the image corresponds to one cycle.

(Supplementary Note 17)

The three-dimensional shape measuring method according to any one of supplementary notes 11 to 16, wherein the projector device generates the first light pattern and the second light pattern from a light emitted from a single light source.

(Supplementary Note 18)

The three-dimensional shape measuring method according to any one of supplementary notes 11 to 17, wherein the projector device is a DLP projector or a liquid crystal projector.

(Supplementary Note 19)

The three-dimensional shape measuring method according to any one of supplementary notes 11 to 18, wherein the measured object is a moving object.

(Supplementary Note 20)

The three-dimensional shape measuring method according to supplementary note 19, wherein the moving object is a face of a person.

(Supplementary Note 21)

A program that causes a computer to function as:
  a unit that controls a single projector device to project a first light pattern whose luminance changes at a first cycle or a second light pattern whose luminance changes at a second cycle that is longer than the first cycle on a measured object;
  a unit that acquires an image of the measured object on which the first light pattern is projected and an image of the measured object on which the second light pattern is projected;
  a unit that, based on a luminance value at each of pixels of an image of the measured object on which the first light pattern is projected, calculates a relative phase value on each part of the measured object corresponding to each of the pixels;
  a unit that, based on a luminance value and the relative phase value at each of pixels of an image of the measured object on which the second light pattern is projected, calculates an absolute phase value on each the part of the measured object corresponding to each of the pixels; and
  a unit that, based on the absolute phase value, calculates three-dimensional coordinates at each the part of the measured object corresponding to each of the pixels.

(Supplementary Note 22)

The program according to supplementary note 19, wherein the unit that acquires the image acquires at least three images captured with different phases of the first light pattern projected on the measured object and acquires one image in which the measured object on which the second light pattern is projected is captured or two images captured with different phases of the second light pattern projected on the measured object.

(Supplementary Note 23)

A computer readable storage medium storing the program according to supplementary note 21 or 22.

REFERENCE SIGNS LIST

10 . . . measured object
20 . . . projector device
30 . . . image capture device
40 . . . image processing device
42 . . . projection pattern control unit
44 . . . image acquisition unit
46 . . . relative phase calculation unit
48 . . . absolute phase calculation unit
50 . . . three-dimensional coordinate calculation unit

The invention claimed is:

1. A three-dimensional shape measuring method comprising:
  projecting, by a projector, a first light pattern having a luminance that changes at a first cycle on a measured object;
  acquiring at least three first images of the measured object on which the first light pattern has been projected at different phases of the first phases;
  projecting, by the projector that projected the first light pattern, a second light pattern having a luminance that changes at a second cycle that is longer than the first cycle on the measured object;
  acquiring a single second image of the measured object on which the second light pattern has been projected, wherein the at least three first images and the single second image each have a corresponding plurality of pixels;
  for each of the at least three first images, calculating, based on first luminance values of the first image for the pixels, relative phase values for parts of the measured object corresponding to each of the pixels;
  calculating, based on the relative phase values and the first luminance values, a parameter of a relational expression representing a relationship between luminance and phase, wherein the parameter corresponds to a physical characteristic of the projector;
  calculating, based on second luminance values of the single second image, based on the relative phase values calculated for the parts of the measured object corresponding to the pixels, and based on the parameter, absolute phase values for the parts of the measured object corresponding to the pixels, wherein only one image of the measured object on which the second light pattern has been projected is used in calculating the absolute phase values, the only one image being the single second image; and
  calculating, based on the absolute phase values, calculating three-dimensional coordinates for each of the parts of the measured object.

2. The three-dimensional shape measuring method according to claim 1, wherein the first light pattern is a sinusoidal pattern.

3. The three-dimensional shape measuring method according to claim 1, wherein the second light pattern is a sinusoidal pattern by which the single second image in an entirety thereof corresponds to one cycle.

4. The three-dimensional shape measuring method according to claim 1, wherein the second light pattern is a luminance slope pattern having a linearly changing luminance.

5. The three-dimensional shape measuring method according to claim 1, wherein the projector that projects generates the first light pattern and the second light pattern via light emitted from a single light source.

6. The three-dimensional shape measuring method according to claim 1, wherein the projector is a DLP projector or a liquid crystal projector.

7. The three-dimensional shape measuring method according to claim 1, wherein the measured object is a moving object.

8. The three-dimensional shape measuring method according to claim 7, wherein the moving object is a face of a person.

* * * * *